United States Patent
Collins, Jr.

(10) Patent No.: US 8,292,181 B1
(45) Date of Patent: Oct. 23, 2012

(54) APPARATUS AND SYSTEM FOR A HYBRID OPTICAL CODE SCANNER

(75) Inventor: Donald A. Collins, Jr., Buford, GA (US)

(73) Assignee: NCR Corporation, Duluth, GA (US)

( * ) Notice: Subject to any disclaimer, the term of this patent is extended or adjusted under 35 U.S.C. 154(b) by 0 days.

(21) Appl. No.: 13/169,309

(22) Filed: Jun. 27, 2011

(51) Int. Cl.
*G06K 7/10* (2006.01)

(52) U.S. Cl. .......... 235/462.11; 235/462.14; 235/462.39

(58) Field of Classification Search ............. 235/462.01, 235/462.11, 462.14, 462.32, 462.36, 462.39, 235/462.41

See application file for complete search history.

(56) References Cited

U.S. PATENT DOCUMENTS

| | | | |
|---|---|---|---|
| 5,886,336 A * | 3/1999 | Tang et al. | 235/462.43 |
| 6,681,993 B1 * | 1/2004 | Nunnink et al. | 235/462.38 |
| 6,899,272 B2 * | 5/2005 | Krichever et al. | 235/462.37 |
| 6,974,084 B2 * | 12/2005 | Bobba et al. | 235/462.39 |
| 8,011,579 B2 * | 9/2011 | Acosta et al. | 235/383 |
| 2006/0022051 A1 * | 2/2006 | Patel et al. | 235/462.14 |
| 2006/0054703 A1 * | 3/2006 | Kahn et al. | 235/462.14 |
| 2009/0020611 A1 * | 1/2009 | Sackett et al. | 235/462.08 |
| 2010/0252635 A1 * | 10/2010 | Drzymala et al. | 235/462.41 |

* cited by examiner

*Primary Examiner* — Daniel Hess
(74) *Attorney, Agent, or Firm* — Harden E. Stevens, III

(57) ABSTRACT

An apparatus and system are presented for scanning optical codes presented to a hybrid optical code scanner where the scanner uses a laser pattern mirror to aid in determining the location of a sweet spot for an imaging scanner in the hybrid optical code scanner. The pattern mirror is positioned so as to reflect laser beams and an image of an optical code to an operator when the optical code is positioned in the imaging scanner's sweet spot.

16 Claims, 3 Drawing Sheets

APPARATUS AND SYSTEM FOR A HYBRID OPTICAL CODE SCANNER

FIELD OF THE INVENTION

The present invention relates generally to a hybrid optical code scanner. More particularly, but not exclusively, the invention relates to an apparatus and system for aiding a user to properly align a two dimensional barcode or photo so that a hybrid optical code scanner can capture an image.

BACKGROUND

Any discussion of the prior art throughout the specification should in no way be considered as an admission that such prior art is widely known or forms part of common general knowledge in the field.

Hybrid optical code scanners (hybrid scanner) are used to read optical codes such as one dimensional (1D) and two dimensional (2D) barcodes. A hybrid scanner includes two optical code scanners that are based on different scanning technologies. One of the optical code scanners is based on laser scanning technology and is referred to as a laser scanner. The laser scanner moves a laser beam across an optical code and captures the reflected laser light to read the optical code. The other optical code scanner is based on imaging scanning technology and is called an imaging scanner. The imaging scanner captures an image of the entire optical code and processes the image to read the optical code.

One dimensional barcodes have been optimized to be read by a laser scanner. However, two dimensional barcodes are not easily read by a laser scanner. In addition, a laser scanner cannot capture an image of a photo or read a barcode being displayed by an electronic device. Imaging scanner can read two dimensional barcodes and capture images of photos but their field of view and depth of field is smaller than the field of view and depth of field for a laser scanner. Because of the smaller fields for imaging scanner, it is critical that a two dimensional barcode or a photo be properly positioned in the imaging scanner's sweet spot before the imaging scanner is able to capture a good quality image.

Therefore, there is a need for a hybrid optical code scanner that provides an effective way to properly align optical codes with the imaging scanner of the hybrid optical code scanner.

SUMMARY OF THE INVENTION

It is an object of the present invention to overcome or ameliorate at least one of the identified limitations, or to provide a useful alternative.

Among its several aspects, the present invention recognizes a condition in a hybrid optical code scanner where it is difficult to identify the location of the imaging scanner's sweet spot. This makes it difficult for an operator of the hybrid optical code scanner to properly position an optical code for scanning.

In accordance with an aspect of the present invention, there is provide an optical indication for locating the imaging scanner's sweet spot to aid an operator in position an optical code for scanning.

In accordance with an aspect of the present invention, there is provided a laser pattern mirror that also reflects an image of an optical code to a predetermined location when the optical code is positioned in the imaging scanner's sweet spot. The predetermined location is positioned so that an operator of the hybrid optical code scanner will see the image of the optical code when the optical code is positioned in the imaging scanner's sweet spot.

In a preferred embodiment, there is provided a hybrid optical code scanner comprising:

a vertical scanning window;

a pattern mirror where the pattern mirror is configured to reflect a laser beam through the vertical scanning window;

a laser scanner for reading optical codes where the laser scanner generates at least one laser scan beam that reflects off of the pattern mirror and passes through the vertical scanning window;

an imaging scanner for reading optical codes where the imaging scanner captures a first image of a first optical code that is positioned in a first predetermined area in front of the vertical scanning window where the first image passes through the vertical scanning window; and where a second image of the first optical code, when the first optical code is positioned in the first predetermined area, is reflected by the pattern mirror through the vertical scanning window to a second predetermined area located above the first predetermined area and in front of the hybrid optical code scanner.

A more complete understanding of the present invention, as well as further features and advantages of the invention, will be apparent from the following Detailed Description and the accompanying Drawings.

BRIEF DESCRIPTION OF THE DRAWINGS

The aspects of the claimed invention can be better understood with reference to the drawings and the detailed description. The drawings are not necessarily drawn to scale. Throughout the drawings, like element numbers are used to describe the same parts throughout the various drawing figures and charts.

DETAILED DESCRIPTION

In the following description, numerous details are set forth to provide an understanding of the claimed invention. However, it will be understood by those skilled in the art that the claimed invention may be practiced without these details and that numerous variations or modifications from the described embodiments are possible.

Figure 1:
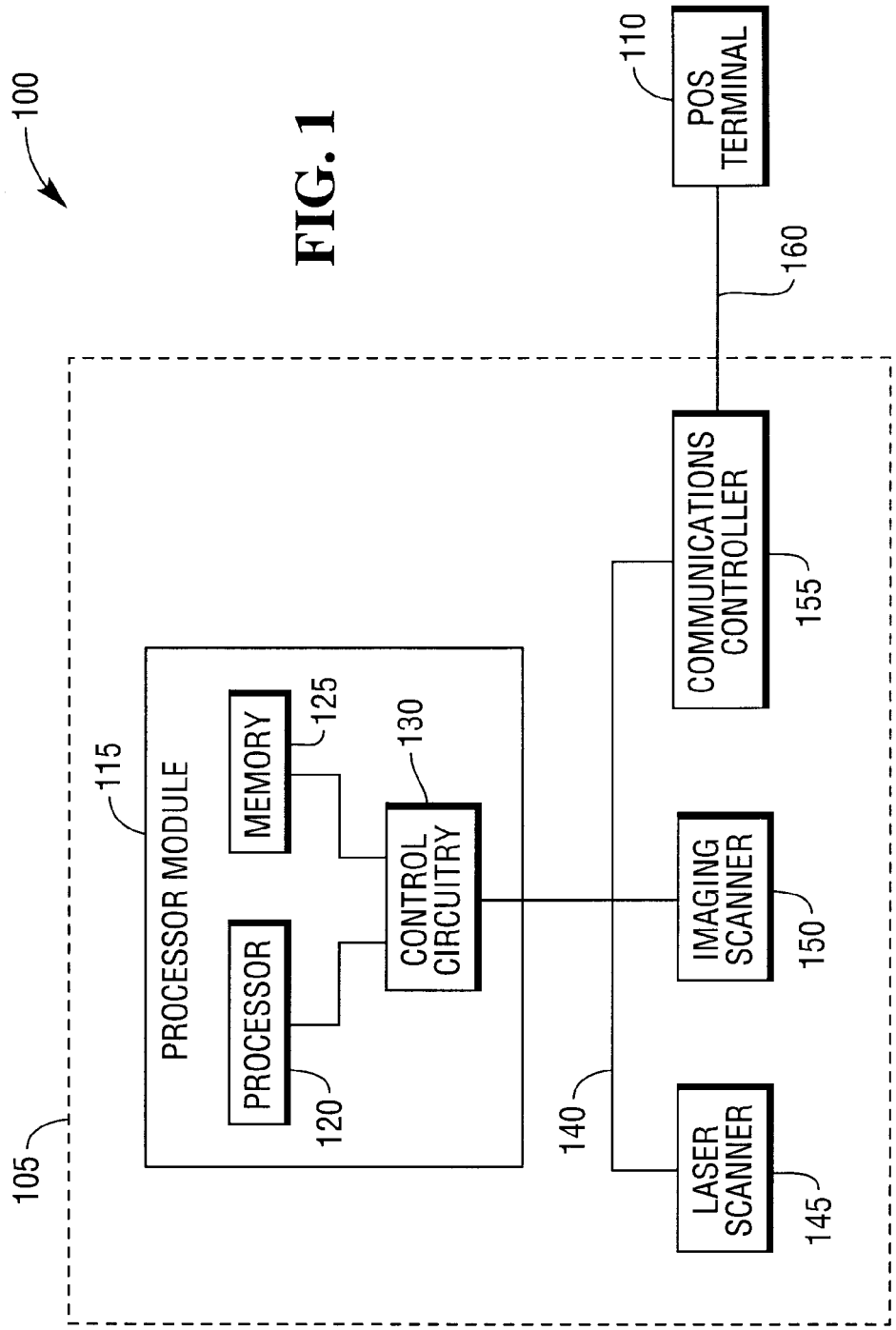
FIG. 1 is a high-level block diagram illustrating an exemplar embodiment of a Point of Sale system.

Referring now to FIG. 1, there is provided a high-level block diagram illustrating an exemplar embodiment of a point of sale (POS) system 100. The system 100 includes a hybrid optical code scanner 105 and a POS terminal 110 where both are connected by a computer network 160. The hybrid optical code scanner 105 includes a processor module 115, a laser scanner 145, an imaging scanner 150 and a communications controller 155.

Within the processor module 115, there is included a processor 120, a memory 125 and control circuitry 130. The memory 125 includes both volatile and non-volatile memory. Software stored in the memory 125 is executed by the processor 120 which causes the processor 125 to control the devices and operation of the hybrid optical code scanner 105. The control circuitry 130 provides an interface between the processor 120 and the memory 125 and between the processor 120 a bus 140 used to communicate with other devices that comprise the hybrid optical code scanner 105 including but not limited to the laser scanner 145, imaging scanner 150 and communications controller 155.

Figure 3:
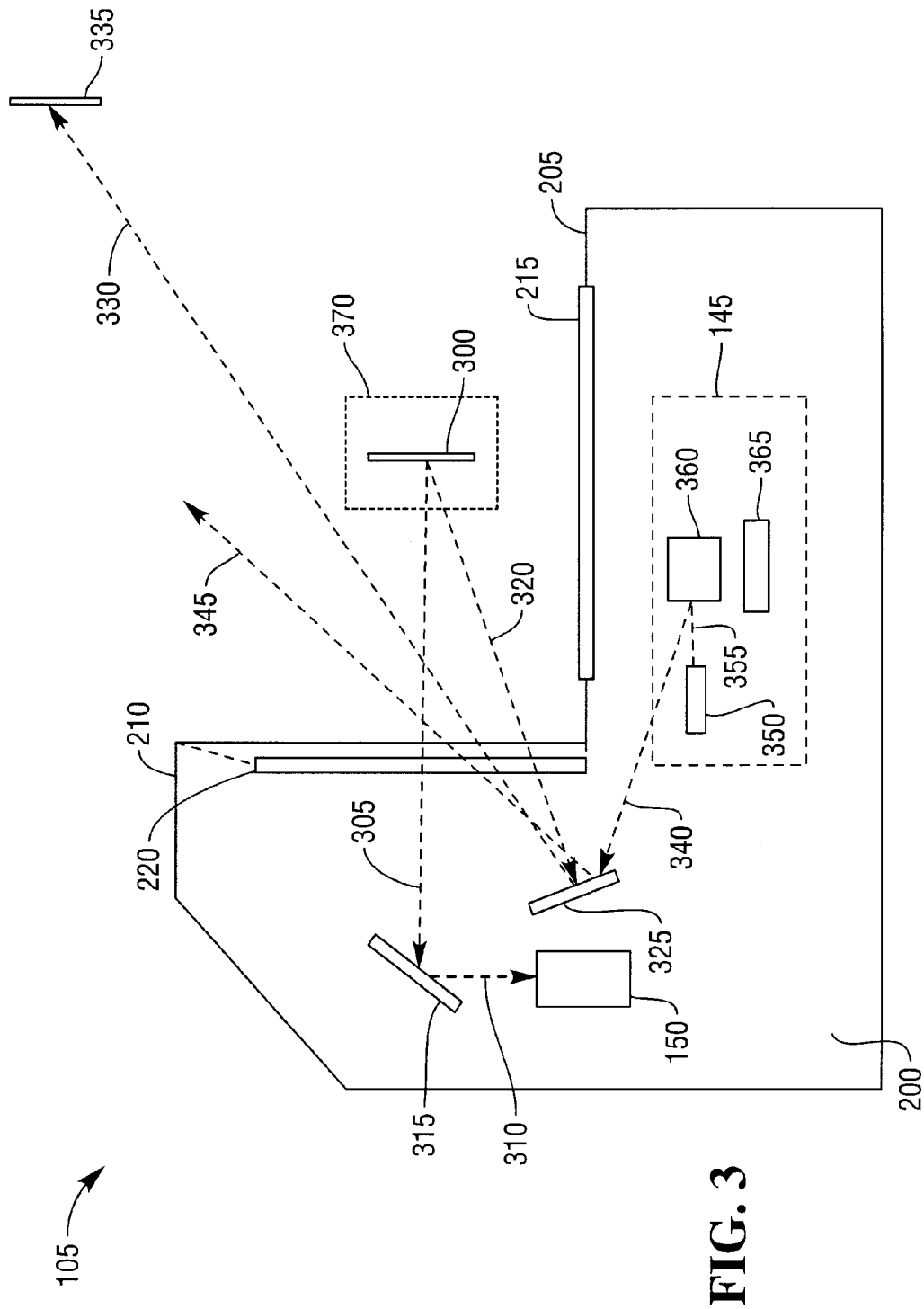
FIG. 3 is high-level cross-sectional drawing further illustrating an exemplar embodiment of a hybrid optical code scanner.

The laser scanner 145 includes a laser generation device (FIG. 3, 350), a laser beam directing device (FIG. 3, 360) for directing a laser beam (FIG. 3, 355) generated by the laser generation device (FIG. 3, 350) and a photo-detector (FIG. 3, 365) for detecting laser light reflected from an optical code back to the laser scanner 145. The laser scanner 145 also includes a pattern mirror (FIG. 3, 325) used to direct a laser beam (FIG. 3, 340) reflected by the laser beam directing device (FIG. 3, 360).

The imaging scanner 150 includes an image capture device such as a CMOS image sensor. When an optical code is presented to the hybrid optical code scanner 105, the imaging scanner 150 captures an image of the optical code and processes the image to recover data encoded in the optical code.

The communications controller 155 includes hardware and software required to communicate with external devices over the computer network 160. In some embodiments, the computer network 160 is implemented using a USB bus that connects the hybrid optical code scanner 105 to the POS terminal 110.

Figure 2:
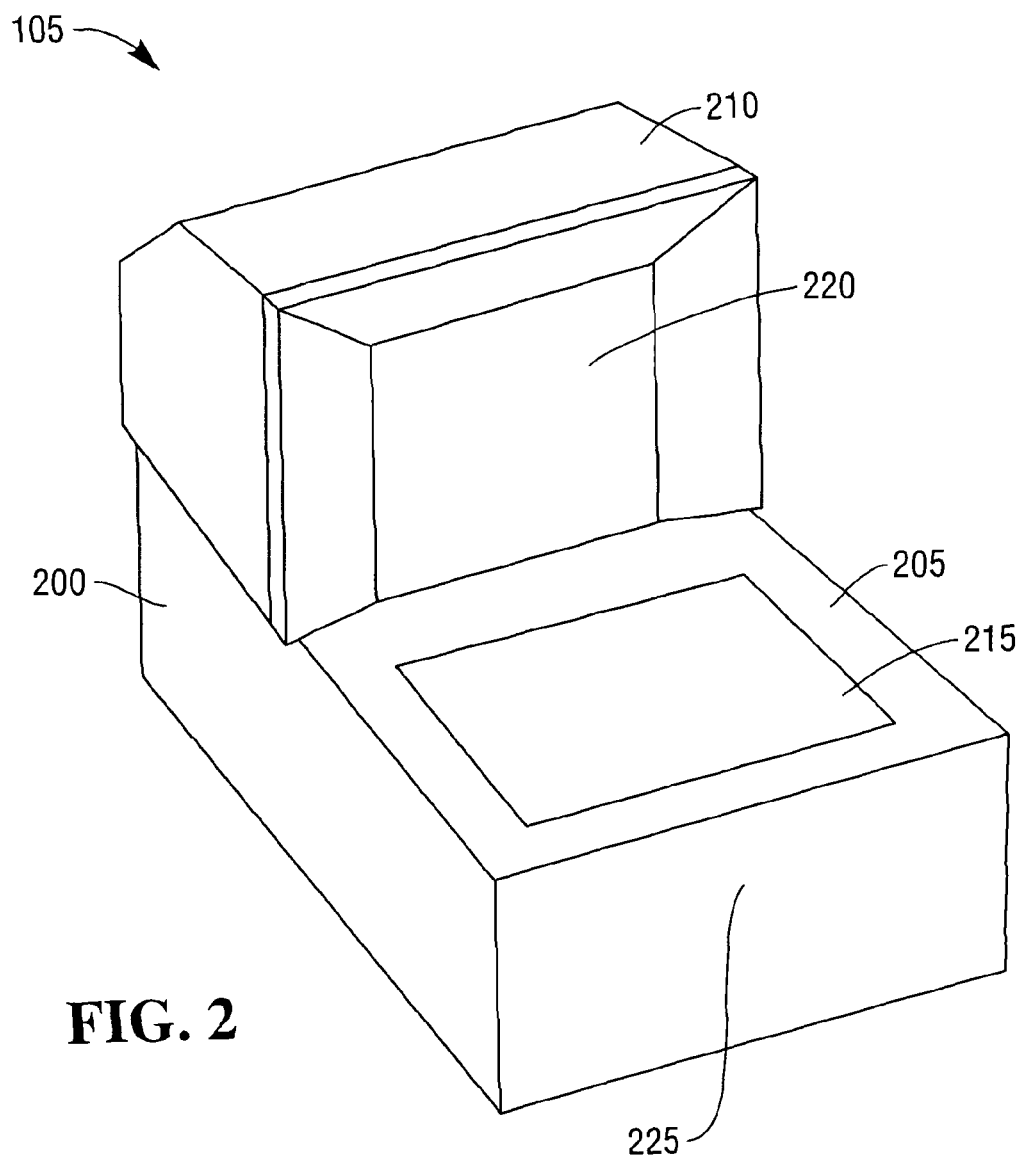
FIG. 2 is a high-level drawing illustrating an exemplar embodiment of a hybrid optical code scanner.

Turning to FIG. 2, there is provided a high-level block diagram illustrating an exemplar embodiment of the hybrid optical code scanner 105. The hybrid optical code scanner 105 includes a housing 200 comprising a vertical housing component 210 and horizontal housing component 205. The vertical housing component 210 includes vertical scanning window 220 and the horizontal housing component 205 includes a horizontal scanning window 215. The vertical scanning window 220 faces the front 225 of the hybrid optical code scanner 105. An operator of the hybrid optical code scanner 105 stands in front 225 of the hybrid optical code scanner 105 facing the vertical scanning window 220 and moves optical codes for scanning through a volume of space generally above the horizontal scanning window 215 and in front of the vertical scanning window 220.

Referring to FIG. 3, there is provided a high-level cross-sectional drawing further illustrating the exemplar embodiment the hybrid optical code scanner 105. The pattern mirror 325 is one of a plurality of pattern mirrors. The pattern mirror 325 receives the laser beam 340 from the laser beam directing device 360 and reflects a laser beam 345 through the vertical scanning window 220 to an area in front of the vertical scanning window 220 and generally over the horizontal scanning window 215. In some embodiments, the area the laser beam 345 is directed to may extend past the perimeter of the horizontal scanning window 215. The laser beam directing device 360 causes the laser beam 340 to move so that it scans a volume of space. If the laser beam 345 strikes and moves across an optical code, the reflected laser light is directed (directing devices not shown) back to the laser scanner 145 where the laser light is detected by the photo-detector 365 and data encoded in the optical code read. Laser scanners, in general, are best suited to read one dimensional (1D) barcodes (which are included as an optical code).

An optical code 300, which in this embodiment is a two dimensional (2D) barcode, is presented to the hybrid optical code scanner 150. A first image of the optical code 300 travels along a path 305 through the vertical scanning window 220 to a mirror 315 where it is reflected along a path 310 to the imaging scanner 150 and captured for processing.

The optical code 300 is positioned over the horizontal scanning window 215 and in front of the vertical scanning window 220 in a location known as the imaging scanner's 150 sweet spot 370. When an optical code is in the sweet spot 370, it falls within the field of vision and depth of field for the imaging scanner 150. This means that the optical code 300 will be visible and in focus when located in the sweet spot 370 and facing the vertical scanning window 220.

Unlike the laser scanner 145 which has a relatively large field of vision and depth of field, the imaging scanner 150 has a relatively small field of vision and short depth of field. Because of this, the sweet spot 370 for the imaging scanner 150 is relatively small and can be hard for an operator to find, especially for untrained operators like those using the hybrid optical code scanner 105 attached to a self-service POS terminal. To aid the operator in finding the sweet spot 370 for the imaging scanner 150, the pattern mirror 325 is positioned not only to reflect the laser beam 340 but also to receive a second image of the optical code 300 received along a path 320 and reflect it through the vertical scanning window 220 along a path 330 to a location 335 in front of the hybrid optical code scanner 105. The location 335 is designed to be at eye level for the operator of the hybrid optical code scanner 105 so that when the operator looks along the path 330 the operator sees the second image of the optical code 300 when the optical code is positioned within the sweet spot 370. Being able to see the second image of the optical code 300 in this way provide positioning feed back to the operator and helps the operator to properly position the optical code 300 so it can be read.

In some embodiments, the optical code 300 is being displayed on a mobile electronic device such as a smartphone or portable pad device. It is difficult for the laser scanner 145 to read optical codes being displayed on an electronic device. Therefore, when an optical code is being displayed by an electronic device for scanning, the device must be positioned in the sweet spot 370 before the optical code can be properly scanned and read. Being able to see the reflected second image of the optical code from the pattern mirror 325 greatly helps properly position the electronic device for proper scanning of the optical code 300.

In still other embodiments, the optical code 300 is a photo where the imaging scanner 150 is used to simply capture an image of the photo. Being able to see the reflected second image of the photo from the pattern mirror 325 also greatly helps properly position the photo.

Although particular reference has been made to an embodiment that includes a POS terminal and examples have been provided illustrating the invention, certain other embodiments, variations and modifications are also envisioned within the spirit and scope of the following claims. For example the POS terminal can be designed for use as an assisted terminal or a self-service terminal.

I claim:

1. A hybrid optical code scanner comprising:
a vertical scanning window;
a pattern mirror where the pattern mirror is configured to reflect a laser beam through the vertical scanning window;
a laser scanner for reading optical codes where the laser scanner generates at least one laser scan beam that reflects off of the pattern mirror and passes through the vertical scanning window;
an imaging scanner for reading optical codes where the imaging scanner captures a first image of a first optical code that is positioned in a first predetermined area in front of the vertical scanning window where the first image passes through the vertical scanning window; and
where a second image of the first optical code, when the first optical code is positioned in the first predetermined area, is reflected by the pattern mirror through the vertical scanning window to a second predetermined area located above the first predetermined area and in front of the hybrid optical code scanner.

2. The hybrid optical code scanner of claim 1, where the hybrid optical code scanner is in a fixed position.

3. The hybrid optical code scanner of claim 1, where the first optical code is a two dimensional optical code.

4. The hybrid optical code scanner of claim 1, wherein the laser scanning includes a laser light detector for detecting laser light reflected from the optical codes and reflected off of the pattern mirror.

5. The hybrid optical code scanner of claim 1, wherein the imaging scanner includes an image capture device for capturing images of optical codes.

6. The hybrid optical code scanner of claim 5, wherein the imaging scanner further includes a mirror that reflects the first image of the first optical code to the image capture device.

7. The hybrid optical code scanner of claim 1, where the second predetermined area is generally positioned so that the second image is visible to an operator of the hybrid optical code scanner.

8. The hybrid optical code scanner of claim 1, wherein the first predetermined area is the imaging scanner's sweet spot.

9. A point of sale terminal system, including:
a hybrid optical code scanner comprising:
a vertical scanning window;
a pattern mirror where the pattern mirror is configured to reflect a laser beam through the vertical scanning window;
a laser scanner for reading optical codes where the laser scanner generates at least one laser scan beam that reflects off of the pattern mirror and passes through the vertical scanning window;
an imaging scanner for reading optical codes where the imaging scanner captures a first image of a first optical code that is positioned in a first predetermined area in front of the vertical scanning window where the first image passes through the vertical scanning window; and
where a second image of the first optical code, when the first optical code is positioned in the first predetermined area, is reflected by the pattern mirror through the vertical scanning window to a second predetermined area located above the first predetermined area and in front of the hybrid optical code scanner.

10. The system of claim 9, where the hybrid optical code scanner is in a fixed position.

11. The system of claim 9, where the first optical code is a two dimensional optical code.

12. The system of claim 9, wherein the laser scanning includes a laser light detector for detecting laser light reflected from the optical codes and reflected off of the pattern mirror.

13. The system of claim 9, wherein the imaging scanner includes an image capture device for capturing images of optical codes.

14. The system of claim 13, wherein the imaging scanner further includes a mirror that reflects the first image of the first optical code to the image capture device.

15. The system of claim 9, where the second predetermined area is generally positioned so that the second image is visible to an operator of the hybrid optical code scanner.

16. The system of claim 1, wherein the first predetermined area is the imaging scanner's sweet spot.

\* \* \* \* \*